J. R. WAGNER.
Cultivator.

No. 106,004.

2 Sheets—Sheet 1.

Patented Aug. 2, 1870.

Inventor
Jacob R. Wagner

J. R. WAGNER.
Cultivator.

No. 106,004.

2 Sheets—Sheet 2.

Patented Aug. 2, 1870.

UNITED STATES PATENT OFFICE.

JACOB R. WAGNER, OF MANADA HILL, PENNSYLVANIA.

IMPROVEMENT IN COMBINED HARROW, CULTIVATOR, WHEELBARROW, AND SLED.

Specification forming part of Letters Patent No. 106,004, dated August 2, 1870.

*To all whom it may concern:*

Be it known that I, JACOB R. WAGNER, of Manada Hill, in the county of Dauphin and State of Pennsylvania, have invented a Combined Harrow, Cultivator, Wheelbarrow, and Sled; and I do hereby declare that the following is a full, clear, and exact description thereof, reference being had to the accompanying drawings, making part of this specification, in which—

Figure 1:
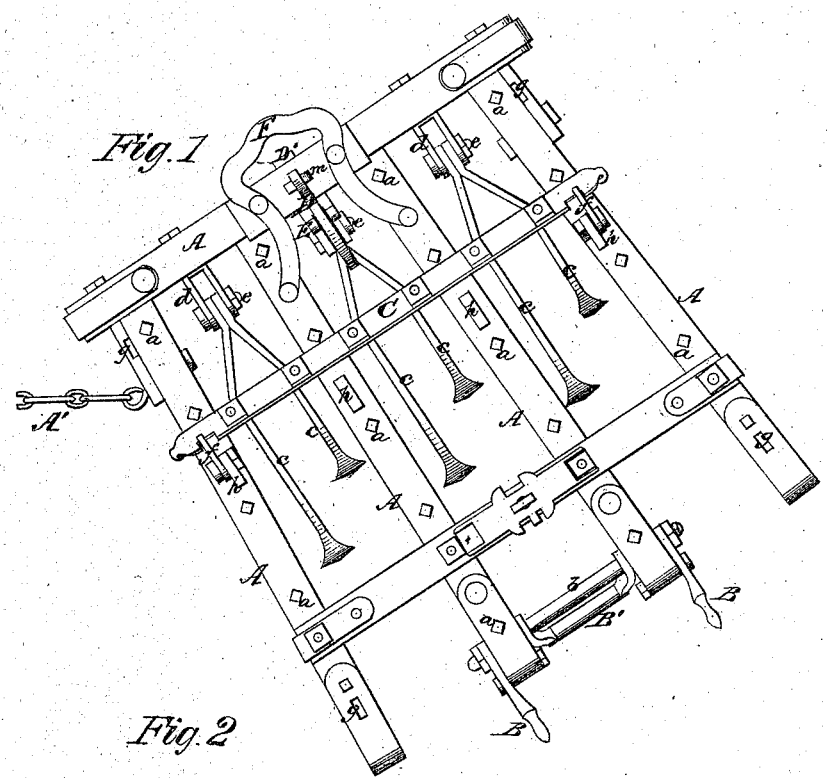
Figure 2:
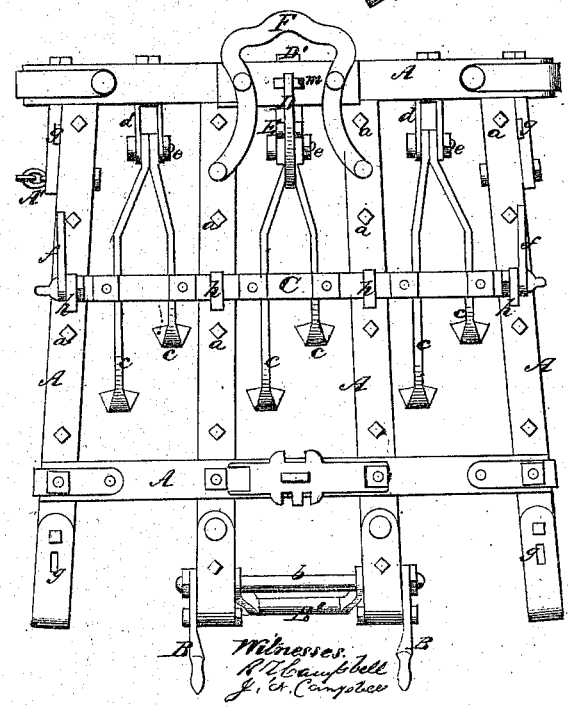
Figure 3:
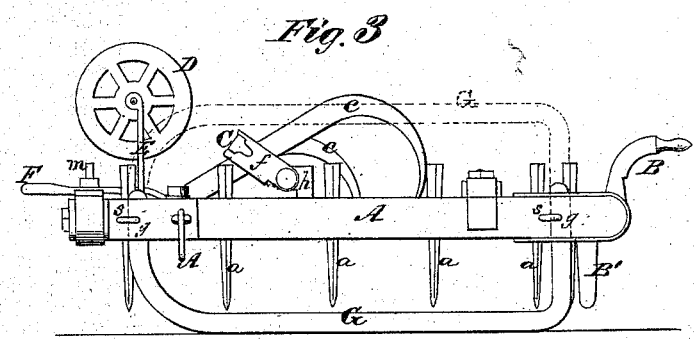
Figure 4:
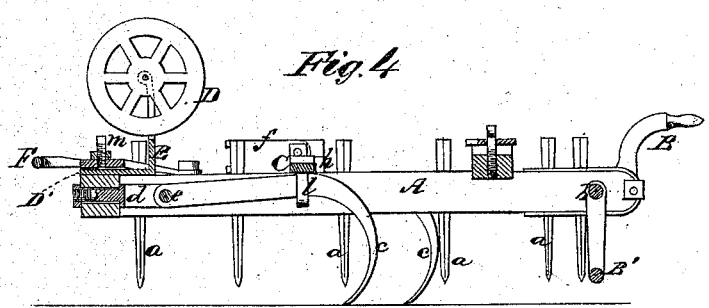
Figure 5:
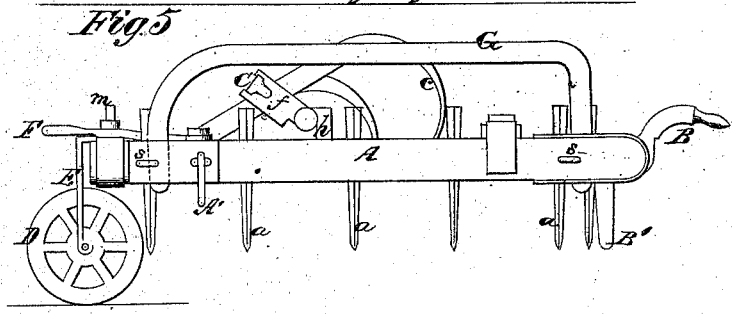

Figure 1, Plate 1, is a top view of the combined implement adapted for use as a harrow. Fig. 2, Plate 1, is a top view of the combined implement adapted for use as a cultivator. Fig. 3, Plate 2, is a side elevation of the combined implement adapted for use as a sled. Fig. 4, Plate 2, is a longitudinal section through the center of the implement when adapted for use as a cultivator. Fig. 5, Plate 2, is a side view of the implement adapted for use as a wheelbarrow.

Similar letters of reference indicate corresponding parts in the several figures.

The nature of my invention consists in adapting the frame of a harrow to receive and in providing it with cultivator-teeth, handles or stilts, sled-runners, and a front wheel, as will be hereinafter explained, whereby by simple adjustments of the parts either a harrow, a cultivator, a sled, or a wheelbarrow can be obtained, as will be hereinafter explained.

To enable others skilled in the art to understand my invention, I will explain its construction and operation.

In the accompanying drawings, A represents a rectangular frame composed of longitudinal bars and transverse bars rigidly secured together, and provided with harrow-teeth $a$. Near one corner of this harrow is attached in a suitable manner a draft-chain, A'. These parts constitute a harrow, as is shown by Fig. 1.

To the front transverse bar or beam, and at the middle of the length thereof, a draft-iron, F, is secured and adapted for having attached to it a draft-chain. To the rear side of this front beam staples $d\,d$ are secured between the longitudinal beams of the frame, and to these staples $d$ the front ends of cultivator-teeth $c\,c$ are pivoted by transverse bolts $e$. These curved cultivator-teeth $c$ are all connected together by means of a transverse bar, C, and loops $l$, through which latter the straight portions of the shanks of the teeth $c$ pass loosely, thus allowing the bar C to be adjusted forward or backward. The ends of the bar C extend out over the outside longitudinal beams A A, and by adjusting the bar back beneath hooks $h\,h$, as shown in Figs. 2 and 4, these hooks will hold the bar and the teeth $c$, attached to it, down in working position, as shown in Fig. 4.

To the two outside hooks, $h\,h$, bifurcated arms $f\,f$ are pivoted, which are adapted to serve as supports and means for holding the cultivator-teeth out of working position, as shown in Figs. 1, 3, and 5. To effect this the bar C is moved forward, and, with the cultivator-teeth elevated, the forked ends of arms $f\,f$ are then raised and the ends of bar C adjusted into these ends. The teeth $c$ thus sustained will be out of working position and out of the way in using the machine.

To the rear ends of the two intermediate longitudinal beams A A handles or stilts B are secured by means of a transverse bolt, $b$. These handles can be adjusted higher or lower, as may be desired.

To the transverse bolt $b$ a swinging bar, B', is pivoted by means of arms formed on its ends, which bar is designed to serve as a means for throwing up the rear end of the machine, and thus clearing the cultivator-teeth $c$ when the latter become clogged by accumulations of trash, &c. To effect this the attendant, who walks behind the machine and grasps the handles B, turns the bar B' over from behind forward. Then, as the animals move forward the machine, the bar B', remaining stationary on the ground, will lift the rear end of the machine, and thus free the teeth $c$. These parts (shown in Figs. 2 and 4) constitute a good cultivator.

Through the front and rear ends of the outside longitudinal beams of frame A oblong holes $g$ are made in a vertical direction, and into these holes $g$ are fitted and secured by set-screws $s\,s$ the upturned extremities of two sled-runners, G G. These runners (shown in Fig. 3) support the frame A and its attachments, and adapt the machine to serve as a good sled for general hauling purposes.

To the front of the frame A a wheel, D, is applied by means of its standards E and a set-screw, $m$, as shown in Fig. 5, which adapts the machine for use as a wheelbarrow.

As a wheelbarrow, the rear handles, B, are used. So, also, may the sled-runners G G be used by inverting these runners and applying them to the frame A, so as to serve as side pieces, as shown in Fig. 5.

When the machine is used as a harrow, a cultivator, or a sled, the wheel D and its standard may be detached from the machine, or arranged on top of it, as shown in Figs. 1, 2, 3, and 4.

Having described my invention, what I claim as new, and desire to secure by Letters Patent, is—

1. The arrangement, in a harrow, of handles B B, the cultivator-teeth c c, and the swinging, elevating, or clearing bar B', substantially in the manner and for the purpose described.

2. The gravitating swinging bar B', applied to a combined harrow and cultivator, in the manner and for the purpose described.

3. The arrangement of the sliding bar C, cultivator-teeth c, hooks h, and forked props or arms f upon the harrow, in the manner and for the purpose substantially as described.

4. The arrangement of the harrow having handles B, the wheelbarrow-wheel D, and the sleigh-runners G G, the several parts being constructed and arranged and operated substantially in the manner described.

JACOB R. WAGNER.

Witnesses:
DAVID F. WAGNER,
JAMES J. CARROLL.